(12) United States Patent
Thompson

(10) Patent No.: US 7,039,995 B2
(45) Date of Patent: May 9, 2006

(54) WINDSHIELD REMOVAL AND REPLACEMENT APPARATUS

(76) Inventor: Bobby D. Thompson, 509 9th Ave., Canyon, TX (US) 79015

( * ) Notice: Subject to any disclaimer, the term of this patent is extended or adjusted under 35 U.S.C. 154(b) by 0 days.

(21) Appl. No.: 10/191,262

(22) Filed: Jul. 8, 2002

(65) Prior Publication Data

US 2004/0003488 A1    Jan. 8, 2004

(51) Int. Cl.
*B25B 27/14*    (2006.01)
(52) U.S. Cl. .................... 29/281.5; 269/21; 269/71
(58) Field of Classification Search ............... 269/17, 269/71, 60, 61, 21; 254/7 B, 7 C, 98; 29/281.5
See application file for complete search history.

(56) References Cited

U.S. PATENT DOCUMENTS 4,183,511 A * 1/1980 Marek ...................... 269/71
5,863,034 A * 1/1999 Vauter ...................... 269/71
6,652,217 B1 * 11/2003 Dettman et al. ............ 414/797

\* cited by examiner

*Primary Examiner*—Robert C. Watson
(74) *Attorney, Agent, or Firm*—John E. Vandigriff; Hammerle Finley Law Firm

(57) ABSTRACT

A portable apparatus for removing and installing windshields on a vehicle disassembles in to several light weight pieces. The small pieces are easily transported and assembled at a job site where a windshield is to be replaced. An adjustable height post is mounted on a base that includes a ramp to be placed under a vehicle wheel by driving the vehicle upon the base. A horizontal arm is mounted on the post. The horizontal arm is raised or lowered by a jack type device mounted on the post. The horizontal arm is moved horizontally to place a windshield, held to the arm by suction cups, in position over the vehicle. The horizontal arm both pivots and rotates to correctly position the windshield. The windshield to be replaced is first removed by the apparatus.

10 Claims, 4 Drawing Sheets

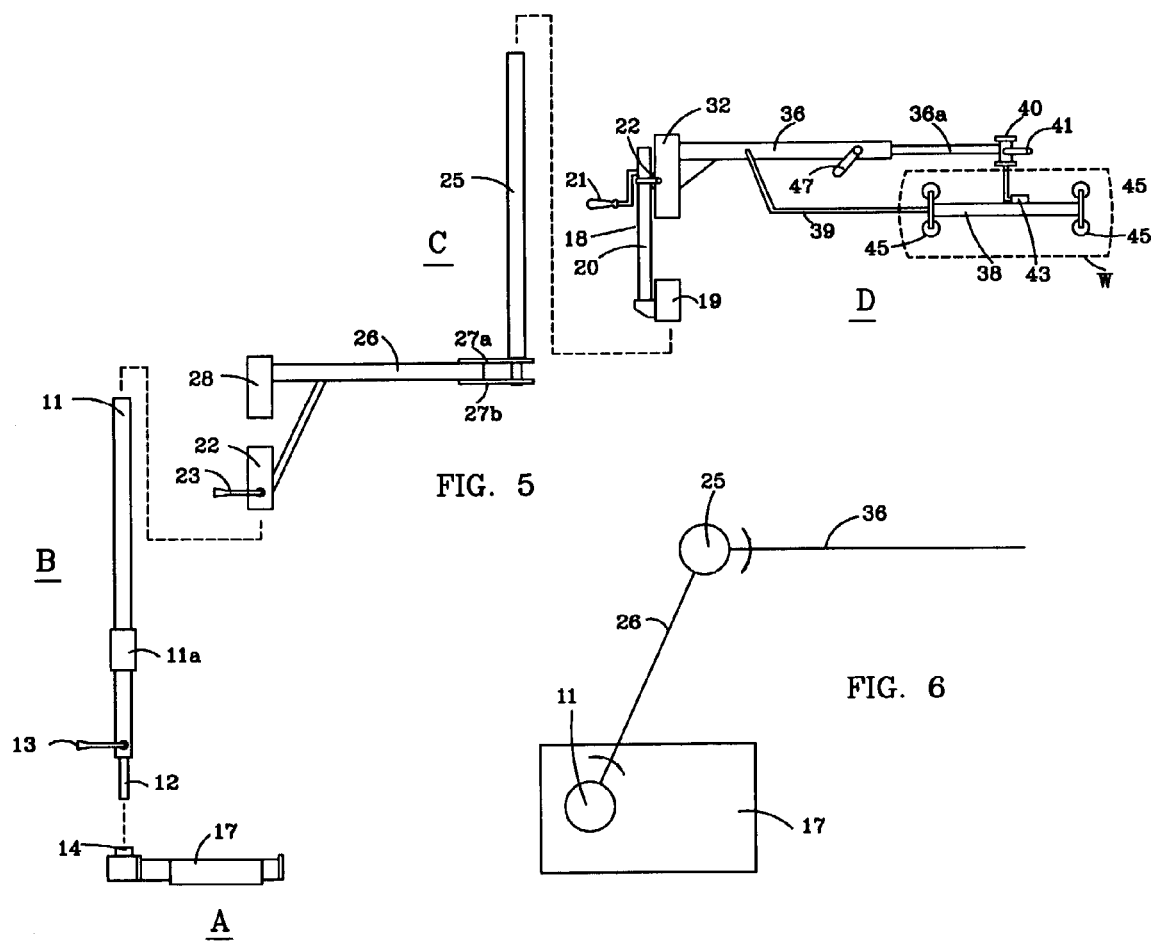

WINDSHIELD REMOVAL AND REPLACEMENT APPARATUS

FIELD OF THE INVENTION

The invention relates to lifting apparatus, and more particularly to a portable apparatus for holding windshields for removal or replacement from a motor vehicle.

BACKGROUND OF THE INVENTION

The below listed patents and descriptions thereof are intended to be for background information only, describing the handling of on a vehicle.

The installation of windshields on vehicles are usually handled by hand with the windshield being handled with suction cups that hold the glass while it is being removed or placed on the vehicle. Large windshields are not easily handled especially in utility vehicles and trucks.

A truck mounted hoist with a pivotal boom is described in U.S. Pat. No. 5,429,253. This apparatus is described as being mounted on the back of a pickup truck for lifting and handling objects, including windshields. The use of the lift and truck required that there be sufficient space for two vehicles, the one holding the hoist, and the one having the windshield replaced.

A simpler apparatus to assist in the installation of a windshield is described in U.S. Pat. No. 5,190,604. The tool in this patent is an expandable position tool with a base for mounting the tool within the passenger compartment of a vehicle and has an extension that can pass through a windshield opening to support a windshield to be installed. There is no provision for removing the old windshield, or lifting the replacement windshield into place upon the extension.

U.S. Pat. No. 5,772,823 describes two grips that include suction cups and handles for lifting and positioning the windshield over the opening into which it is to be placed.

SUMMARY OF THE INVENTION

The invention is a portable apparatus for removing and installing windshields on a vehicle that disassembles in to several light weight pieces. The small pieces are easily transported and assembled at a job site where a windshield is to be replaced. An adjustable height post is mounted on a base that includes a ramp to be placed under a vehicle wheel by driving the vehicle upon the base. A horizontal arm is mounted on the post. The horizontal arm is raised or lowered by a jack type device mounted on the post. The horizontal arm is moved horizontally to place a windshield, held to the arm by suction cups, in position over the vehicle. The horizontal arm both pivots and rotates to correctly position the windshield. The windshield to be replace is first removed by the apparatus.

The technical advance represented by the invention as well as the objects thereof will become apparent from the following description of a preferred embodiment of the invention when considered in conjunction with the accompanying drawings, and the novel features set forth in the appended claims.

BRIEF DESCRIPTION OF THE DRAWINGS

FIG. 5 shows the four basic parts of the apparatus; and

FIG. 6 shows a diagram illustrating the utilization of the extension arm.

DESCRIPTION OF A PREFERRED EMBODIMENT

Figure 1:
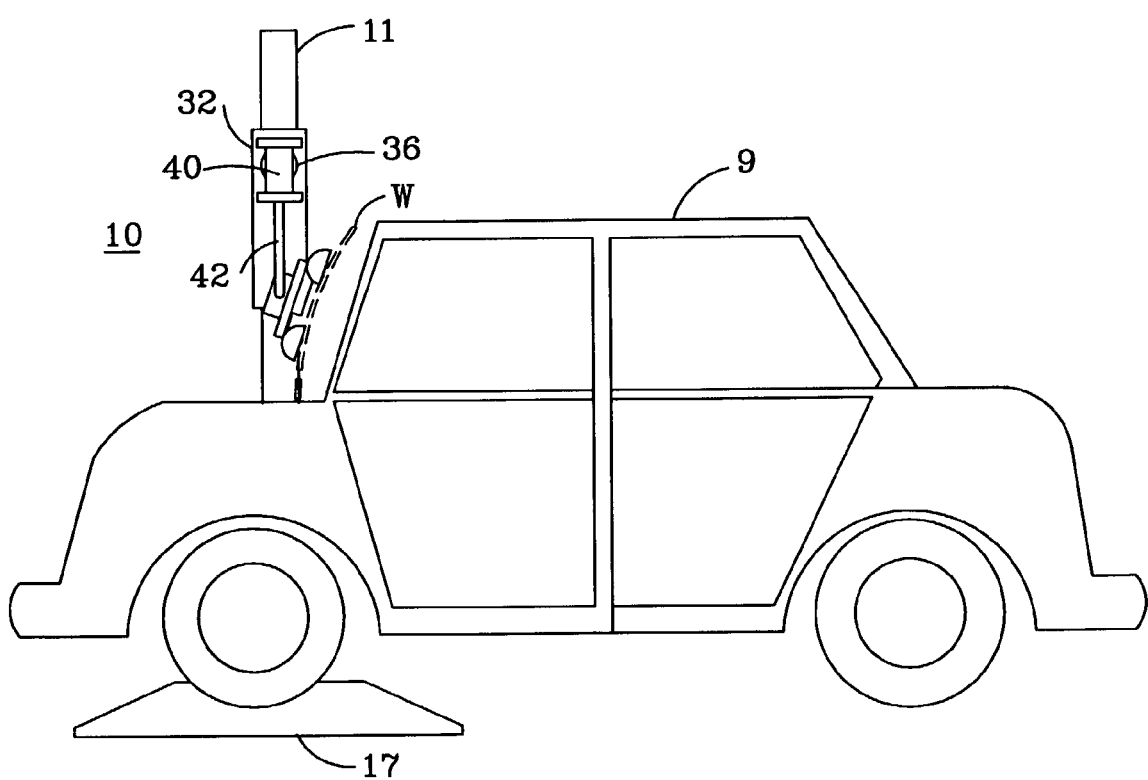
FIG. 1 shows the apparatus of the invention holding a windshield over a vehicle.

The invention is a portable apparatus 10 for holding windshields for removal or replacement from a motor vehicle. The basic concept and use of the invention is illustrated in FIG. 1 where an automobile 9 is driven adjacent to the apparatus 10 with a wheel of the automobile on a base portion 17 of the apparatus 10. A windshield W is held by suction cups mounted on an arm 42, which is attached to a part 40 mounted on horizontal arm 36. Horizontal arm 36 is secured to cylinder 32 that is mounted on vertical post 11.

Figure 2:
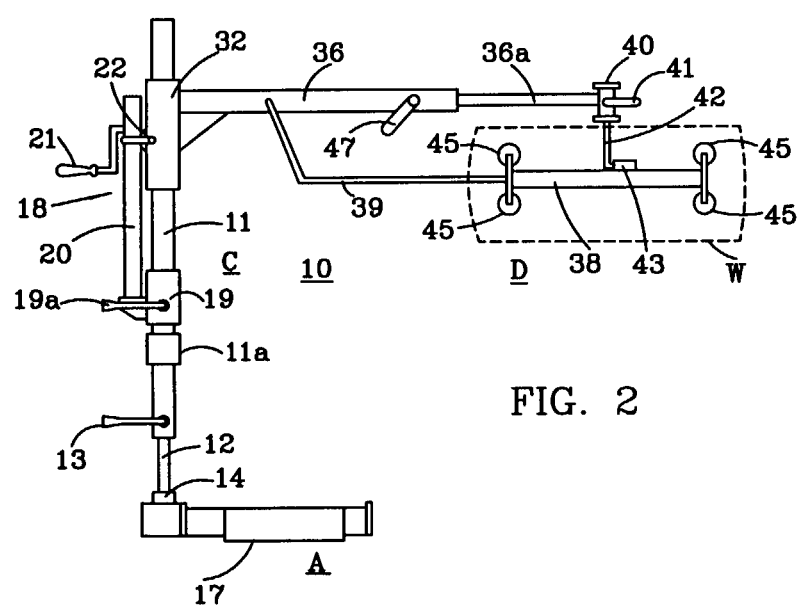
FIG. 2 is a front view of the apparatus of the invention.

A more detailed side view of windshield apparatus 10 is shown in FIG. 2. Apparatus 10 includes a base 17 having an opening in a circular bracket 14 into which is place shaft 12 which is movably mounted in post 11. Shaft 12 is held in a fixed position in post 11 by screw clamp 13. Assembly C, which is adjustable upward and horizontally, is mounted on shaft 11 by lowering cylinder mounts 19 and 32 onto shaft 11. Stop bracket 11a prevents assembly C from moving downward. Clamp screw 19a secures cylinder mount 19 to shaft 11. Assembly C has a jack 18 which includes a handle 21 and gear 22 which moves cylinder 32 up and down to adjust the height of the windshield W. Arm 36 is secured to cylinder 32 and extends horizontally. Shaft 36a is movably mounted in horizontal arm 36 and may be held in a fixed position by screw clamp 47. Shaft 45 may extend horizontally or rotated in arm 36.

Cylinder 40, on the end of shaft 36a, holds shaft 42 in a vertical position by clamp 41. Shaft 42 has a lower end secured in bracket 43. Arm 38 is secured to bracket 43, and has four suction cups 45 mounted thereon, two on each end. Brace 39 extends out of the end of arm 38 and may be used to position windshield W in a correct position over an automobile. Brace 39 can be used to move windshield W horizontally by moving shaft 36a into and out of arm 36. Also shaft 39 can be used to rotate windshield W by rotating brace 39 and pivoting arm 38 about shaft 42 in bracket 43.

In removing an old windshield, the suction cups 45 are attached to the windshield. Jack 18 is used to raise the windshield up from its position on the automobile, then arm 36 can be rotated on shaft 11 to move the windshield from over the automobile. A new windshield W is then positioned with suction cups 45, rotated and lowered into position.

Figure 3:
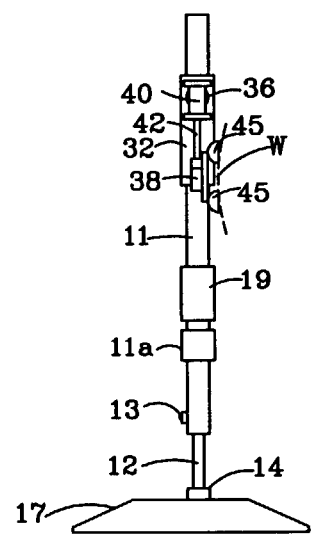
FIG. 3 is an end view of the apparatus of the invention.

FIG. 3 is an end view of windshield apparatus 10. This view is basically the same as the view in FIG. 1 with the automobile removed. Post 11 is mounted on shaft 12 and base 17. The windshield W is held vertically by suction cups 45 and extends away from post 11 by arm 36 on which cylinder 40 and shaft 42 are mounted.

Figure 4:
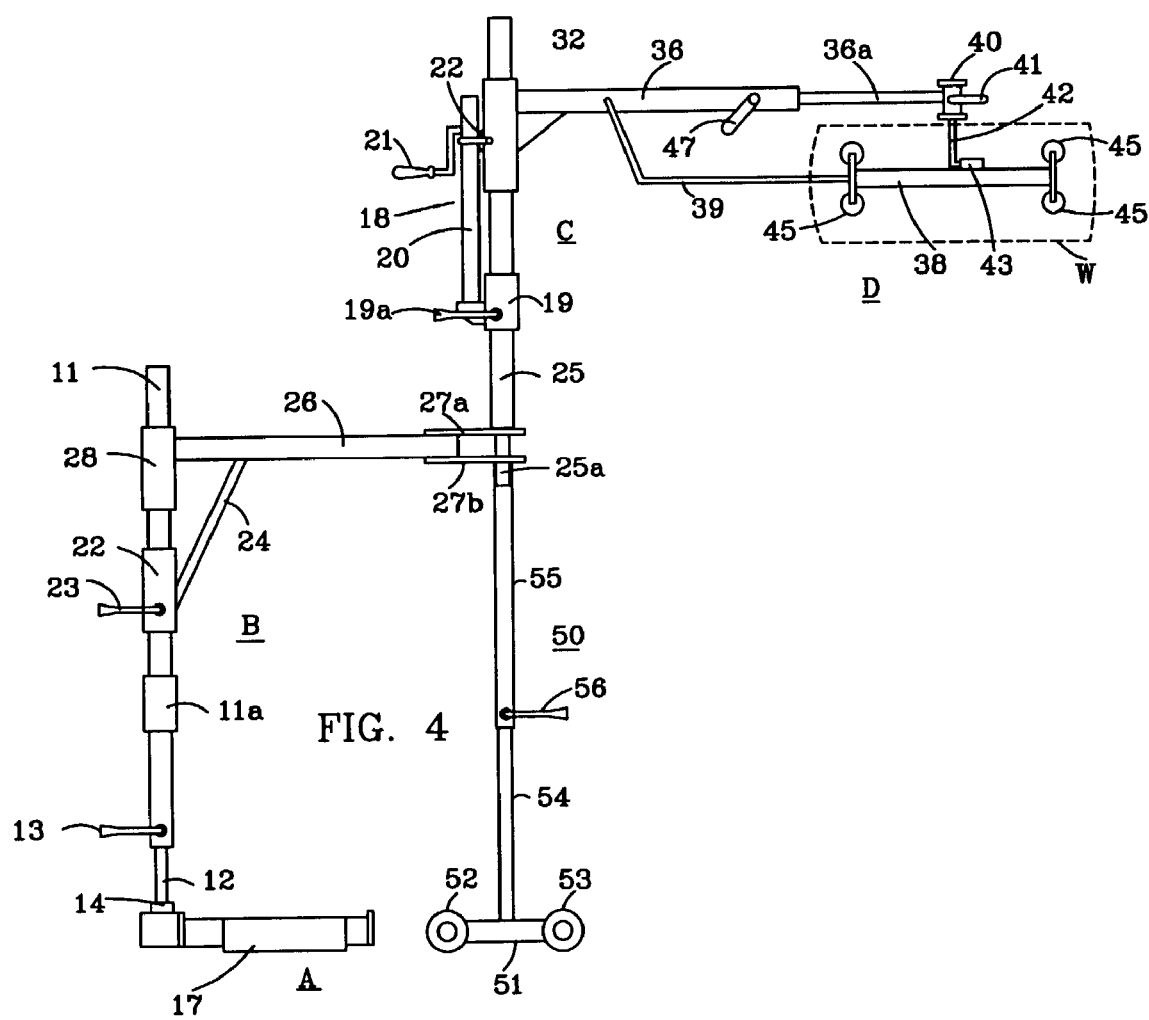
FIG. 4 shows the invention with an extension arm.

FIG. 4 shows the windshield apparatus with an extension mount B. The extension mount includes two cylinders 22 and 28 which are position on shaft 11. Cylinder 22 has a clamping screw 23 to securely clamp cylinder 22, and the extension mount, in a secured position on shaft 11. Arm 26 extends horizontally from cylinder 28 and is braced by support 24 extending between cylinder 22 and arm 26. On the end of arm 26 are two bracket arms 27a and 27b into which is mounted a shaft 25. Shaft 25 has a reduced diameter end 25a that is rotatably mounted in brackets 27a and 27b.

An optional support 50 may be mounted under the end of arm 26. Support 50 has a shaft 55 that is mounted around and under the end 25a of shaft 25. A shaft 54 is slidably mounted in shaft 55 and secured therein by screw clamp 56. On the lower end or shaft 54 is a pair of roller wheels 52 and 53 that are mounted on base 51. The lower end of shaft 54 is mounted on base 51 between roller wheels 52 and 53. Support 50 is used when the weight of the apparatus and windshield would cause the entire apparatus 10 to tilt under the weight of the windshield.

The windshield positioning assembly C, which includes jack 18 and it's associated mounted parts, are mounted on shaft 25, and held in a desired position by clamp screw 19a. Assembly D, that holds the windshield, extends horizontally from shaft 25.

FIG. 5 shows the five basic assembly parts of the windshield mount apparatus. Assembly A is the base 17 with mounted bracket 14. Assembly B includes post 11 and shaft 12, clamp screw 13, and stop 11a. Assembly C is optional and may be mounted between assembly B and assembly D. For automobiles, assembly D would be mounted on post 11 since the height and reach of windshields on smaller automobiles is not as great as that of larger vehicles, such as trucks and motor homes. When a greater height and horizontal reach is required, the Assembly C is mounted on post 11, and then assembly D is mounted on shaft 25.

FIG. 6 illustrates the flexibility when using all of the assemblies A, B, C and D. Base 17 holds post 11. Assembly C, which is mounted on post 11, includes arm 26 and shaft 25. Assembly D, which includes arm 36, is mounted on shaft 25. Arm 26 may be rotated about post 11 and arm 36 can be rotated around shaft 25. This gives the flexibility of positioning the windshield mounted on assembly D in various positions to accommodate different sizes and styles of vehicles. The additional height provided when mounting assembly D on assembly C provides the flexibility of different heights.

The invention claimed is:

1. An apparatus for removing and installing windshields on a vehicle that disassembles in to several light weight pieces, comprising:
    a base;
    a post assembly mountable on said base;
    a jack assembly mounted on said post;
    a horizontal arm assembly, including a plurality of suction cups, mounted on said jack assembly for holding a windshield; and
    an extension mount to accommodate mounting a windshield on large vehicles.

2. The apparatus according to claim 1, wherein said horizontal arm assembly is adjustable horizontally, and includes a pivotal arm for adjusting the vertical position of the windshield.

3. The apparatus according to claim 1, wherein said jack assembly is vertically adjustable on said post assembly.

4. The apparatus according to claim 1, wherein said horizontal arm both pivots and rotates to correctly position the windshield.

5. The apparatus according to claim 1, including an extension device mounted on said post, and said horizontal arm assembly is mounted on said extension device.

6. An apparatus for removing and installing windshields on a vehicle that disassembles in to several light weight pieces, comprising:
    a base;
    a post assembly mountable on said base;
    a jack assembly mounted on said post;
    a horizontal arm assembly mounted on said jack assembly, includes a pivotal arm and a plurality of section cups for holding the windshield; and
    an extension mount to accommodate mounting a windshield on large vehicles.

7. The apparatus according to claim 6, wherein said horizontal arm assembly is adjustable horizontally and is pivotal for adjusting the vertical position of the windshield.

8. The apparatus according to claim 6, wherein said jack assembly is vertically adjustable on said post assembly.

9. The apparatus according to claim 6, wherein said horizontal arm both pivots and rotates to correctly position the windshield.

10. The apparatus according to claim 6, including an extension device mounted on said post, and said horizontal arm assembly is mounted on said extension device.

* * * * *